United States Patent
Shim et al.

(10) Patent No.: US 11,482,699 B2
(45) Date of Patent: Oct. 25, 2022

(54) NEGATIVE ELECTRODE INCLUDING ACTIVE MATERIAL HAVING CORE-SHELL STRUCTURE, MANUFACTURING METHOD THEREOF AND SECONDARY BATTERY INCLUDING THE SAME

(71) Applicants: Hyundai Motor Company, Seoul (KR); Kia Motors Corporation, Seoul (KR); Industry Foundation of Chonnam National University, Gawangju (KR)

(72) Inventors: Jin Yong Shim, Asan-si (KR); Karmegam Dhanabalan, Amaravathipudur (IN); Ho Young Jung, Gwangju (KR)

(73) Assignees: Hyundai Motor Company, Seoul (KR); Kia Motors Corporation, Seoul (KR); Industry Foundation of Chonnam National University, Gawangju (KR)

(*) Notice: Subject to any disclaimer, the term of this patent is extended or adjusted under 35 U.S.C. 154(b) by 415 days.

(21) Appl. No.: 16/524,489

(22) Filed: Jul. 29, 2019

(65) Prior Publication Data
US 2020/0212434 A1    Jul. 2, 2020

(30) Foreign Application Priority Data
Dec. 31, 2018 (KR) .................. 10-2018-0173268

(51) Int. Cl.
H01M 4/36 (2006.01)
H01M 4/56 (2006.01)
(Continued)

(52) U.S. Cl.
CPC .......... *H01M 4/364* (2013.01); *H01M 4/56* (2013.01); *H01M 4/583* (2013.01); *H01M 4/622* (2013.01);
(Continued)

(58) Field of Classification Search
None
See application file for complete search history.

(56) References Cited

U.S. PATENT DOCUMENTS

| | | | | |
|---|---|---|---|---|
| 5,045,086 A | * | 9/1991 | Juergens | H01M 10/125 29/623.1 |
| 2010/0258761 A1 | * | 10/2010 | Kim | H01M 4/1393 252/182.1 |
| 2015/0306570 A1 | * | 10/2015 | Mayes | H01G 11/24 424/125 |

FOREIGN PATENT DOCUMENTS

KR    10-2010-0041928 A    4/2010

OTHER PUBLICATIONS

Wang, Leying, et al. "Tracking the morphology evolution of nano-lead electrodeposits on the internal surface of porous carbon and its influence on lead-carbon batteries." Electrochimica Acta 222 (2016): 376-384 (Year: 2016).*

(Continued)

*Primary Examiner* — Ula C Ruddock
*Assistant Examiner* — Amanda Rosenbaum
(74) *Attorney, Agent, or Firm* — Morgan, Lewis & Bockius LLP

(57) ABSTRACT

A negative electrode of a secondary battery may include an electrode plate including lead; and an active material layer provided on the electrode plate and including composite particles having a core-shell structure, wherein a core of the composite particle includes lead; a shell of the composite (Continued)

particle includes carbon; and a specific surface area of the composite particles is 1 to 5,000 m²/g.

16 Claims, 3 Drawing Sheets

(51) Int. Cl.
*H01M 4/583* (2010.01)
*H01M 4/88* (2006.01)
*H01M 4/62* (2006.01)
*H01M 4/02* (2006.01)
*H01M 4/04* (2006.01)

(52) U.S. Cl.
CPC .... *H01M 4/8882* (2013.01); *H01M 2004/021* (2013.01); *H01M 2004/027* (2013.01)

(56) References Cited

OTHER PUBLICATIONS

Dhanabalan, K., et al. "Novel core-shell structure of a lead-activated carbon (Pb@ AC) for advanced lead-acid battery systems." Journal of Materials Science: Materials in Electronics 28.14 (2017): 10349-10356 (Year: 2017).*

* cited by examiner

NEGATIVE ELECTRODE INCLUDING ACTIVE MATERIAL HAVING CORE-SHELL STRUCTURE, MANUFACTURING METHOD THEREOF AND SECONDARY BATTERY INCLUDING THE SAME

CROSS-REFERENCE TO RELATED APPLICATION

The present application claims priority to Korean Patent Application No. 10-2018-0173268 filed on Dec. 31, 2018, the entire contents of which is incorporated herein for all purposes by this reference.

BACKGROUND OF THE INVENTION

Field of the Invention

The present invention relates to a negative electrode including an active material having a core-shell structure, a manufacturing method thereof and a secondary battery including the same. More particularly, it relates to an ultrabattery to which an active material having a core-shell structure is applied.

Description of Related Art

In general, an ultrabattery refers to a battery for hybrid vehicles which is produced by combining an ultracapacitor (or a supercapacitor) and a lead-acid battery used in conventional internal combustion engines. In a transitional stage in which lithium batteries or fuel cells are commercialized in the hybrid vehicle market, a nickel metalhydride battery occupies the majority of batteries until now. The nickel metal hydride battery has an energy density and a power density, which satisfy requirements of hybrid vehicles, and has a long lifespan. However, the nickel metal hydride battery is very expensive. To make up for such a drawback, an ultrabattery, in which a lead-acid battery being inexpensive and having an excellent energy density and an ultracapacitor having an excellent power density are combined to exhibit performance suitable for hybrid vehicles, has been developed. Such an ultrabattery has advantages, such as low price, enhanced power characteristics and a long lifespan, and is thus being vigorously developed. However, such ultrabattery technology was not yet properly developed in Korea, but there is a high possibility that the ultrabattery technology will be applied to hybrid vehicles and enter the large-capacity energy storage market and thus localization of the ultrabattery technology is urgently required, heavy energy loss was still caused by sulfation reaction between an electrolyte and electrodes including lead due to charge and discharge for a long time, and consequently, a discharge capacity was not sufficient.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a negative electrode active material which suppresses sulfation at a negative electrode during discharging and may thus reduce activation loss and Ohmic loss, as compared to conventional lead-acid batteries.

Various aspects of the present invention are directed to providing an electrode for ultrabatteries which may be driven at a voltage having a higher forward voltage driving range, and a manufacturing method thereof.

Various aspects of the present invention are directed to providing a negative electrode of a secondary battery, the negative electrode including an electrode plate including lead, and an active material layer provided on the electrode plate and including composite particles having a core-shell structure, wherein a core of the composite particle may include lead and a shell of the composite particle may include carbon.

In an exemplary embodiment of the present invention, the lead may form a crystalline structure oxidized by heat treatment.

In another exemplary embodiment of the present invention, the carbon may form a porous amorphous structure oxidized by heat treatment.

In yet another exemplary embodiment of the present invention, an average pore size of particles of the carbon may be 1 to 100 nm.

In yet another exemplary embodiment of the present invention, a specific surface area of the composite particles may be 1 to 5,000 m$^2$/g.

In still yet another exemplary embodiment of the present invention, the specific surface area of the composite particles may be 900 to 1,500 m$^2$/g.

In a further exemplary embodiment of the present invention, a pore volume of the composite particles may be 0.1 to 20 cm$^3$/g.

In another further exemplary embodiment of the present invention, a ratio of the crystalline structure in the composite particles may be 0.1 to 50%.

In yet another further exemplary embodiment of the present invention, a weight ratio of the lead to the carbon in the active material layer may be 1:0.001 to 1:9.

Various aspects of the present invention are directed to providing a secondary battery including a positive electrode, the negative electrode, and an electrolyte interposed between the positive electrode and the negative electrode.

Various aspects of the present invention are directed to providing a manufacturing method of a negative electrode of a secondary battery, the manufacturing method including preparing a mixture by physically mixing lead and carbon, preparing an active material including composite particles having a core-shell structure by performing heat treatment of the mixture, preparing an electrode slurry by mixing the active material with a binder and a solvent, and manufacturing the negative electrode by forming a coating layer by coating an electrode plate including lead with the electrode slurry, wherein, in the preparing the mixture, the lead may include lead particles having a diameter of 0.1 to 50 μm, and, in the preparing the active material, a core of the composite particle may include the lead, and a shell of the composite particle may include the carbon.

In an exemplary embodiment of the present invention, in the preparing the mixture, the carbon may include carbon particles having a diameter of 0.01 to 50 μm.

In another exemplary embodiment of the present invention, in the preparing the mixture, a content of the lead may be 10 to 99 parts by weight and a content of the carbon may be 0.1 to 90 parts by weight.

In yet another exemplary embodiment of the present invention, in the preparing the mixture, the mixture may be prepared by physically stirring the lead and the carbon at a temperature of 20° C. to 30° C. for 10 minutes to 24 hours.

In yet another exemplary embodiment of the present invention, in the preparing the active material, the composite particles may be prepared by performing heat treatment of the mixture at a temperature of 100° C. to 380° C. for 1 to 24 hours.

In still yet another exemplary embodiment of the present invention, in the preparing the electrode slurry, a content of the active material may be 2 to 94% by weight, a content of the binder may be 1 to 48% by weight, and a content of the solvent may be 5 to 95% by weight.

In a further exemplary embodiment of the present invention, in the preparing the electrode slurry, the binder may be one selected from the group consisting of Nafion, polyester (PET), polyphenyl oxide (PPO), polytetrafluoroethylene (PTFE), poly etherether ketone (PEEK), polyvinylidene fluoride (PVDF), polyphenylene sulfide (PPS), carboxymethyl cellulose sodium (CMS), styrene butadiene rubber (SBR), polyethylene glycol (PEG) and combinations thereof.

In another further exemplary embodiment of the present invention, in the manufacturing the negative electrode, a thickness of the coated active material layer may be 1 to 100 μm.

Other aspects and exemplary embodiments of the present invention are discussed infra.

The above and other features of the present invention are discussed infra.

Figure 1:
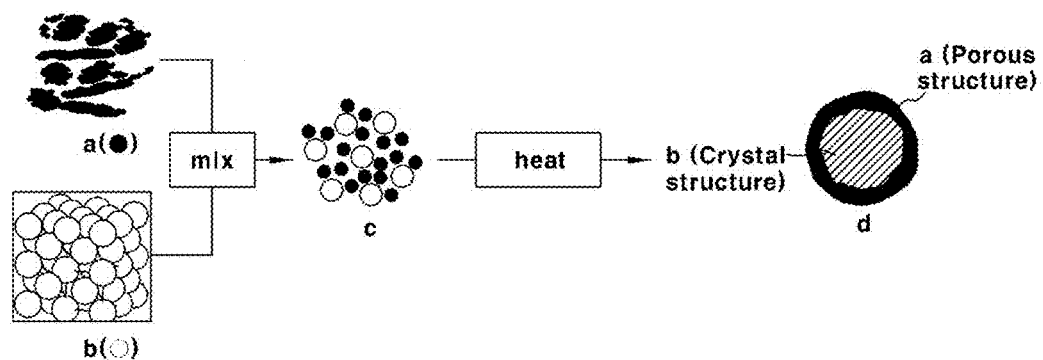
FIG. 1 is a view exemplarily illustrating a manufacturing process of an active material including composite particles having a core-shell structure according to an exemplary embodiment of the present invention.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will be made in detail to various embodiments of the present invention, examples of which are illustrated in the accompanying drawings and described below. While the present invention will be described in conjunction with exemplary embodiments of the present invention, it will be understood that the present description is not intended to limit the present invention to the exemplary embodiments. On the contrary, the present invention is intended to cover not only the exemplary embodiments of the present invention, but also various alternatives, modifications, equivalents and other embodiments within the spirit and scope of the present invention as defined by the appended claims.

In the following description of the embodiments, the same elements are denoted by the same reference numerals even though they are depicted in different drawings. In the drawings, dimensions of structures are exaggerated as compared to actual dimensions thereof, for clarity of description. In the following description of the embodiments, terms, such as "first", "second", etc., may be used to describe various elements but do not limit the elements. These terms are used only to distinguish one element from other elements. For example, a first element may be named a second element and similarly the second element may be named the first element, within the spirit and scope of the present invention. Singular expressions may encompass plural expressions, unless they have clearly different contextual meanings.

In the following description of the embodiments, terms, such as "comprising", "including", "having", etc., will be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same. In addition, it will be understood that, when a part, such as a layer, a film, a region or a plate, is said to be "on" another part, the part may be located "directly on" the other part or other parts may be interposed between both parts. In the same manner, it will be understood that, when a part, such as a layer, a film, a region or a plate, is said to be "under" another part, the part may be located "directly under" the other part or other parts may be interposed between both parts.

All numbers, values and/or expressions representing amounts of components, reaction conditions, polymer compositions and blends used in the description are approximations in which various uncertainties in measurement generated when these values are acquired from essentially different things are reflected and thus, it will be understood that they are modified by the term "about", unless stated otherwise. Furthermore, it will be understood that, if a numerical range is included in the description, such a range includes all continuous values from a minimum value to a maximum value of the range, unless stated otherwise. Furthermore, if such a range refers to integers, the range includes all integers from a minimum integer to a maximum integer, unless stated otherwise.

In the following description of the embodiments, it will be understood that, when the range of a variable is stated, the variable includes all values within the stated range including stated end points of the range. For example, it will be understood that a range of "5 to 10" not only includes values of 5, 6, 7, 8, 9 and 10 but also includes arbitrary subranges, such as a subrange of 6 to 10, a subrange of 7 to 10, a subrange of 6 to 9, a subrange of 7 to 9, etc. and arbitrary values between integers which are valid within the scope of the stated range, such as 5.5, 6.5, 7.5, 5.5 to 8.5, 6.5 to 9, etc. Furthermore, for example, it will be understood that a range of "10% to 30%" not only includes all integers including values of 10%, 11%, 12%, 13%, . . . 30% but also includes arbitrary subranges, such as a subrange of 10% to 15%, a subrange of 12% to 18%, a subrange of 20% to 30%, etc., and arbitrary values between integers which are valid within the scope of the stated range, such as 10.5%, 15.5%, 25.5%, etc.

Various embodiments of the present invention relate to a negative electrode including an active material having a core-shell structure, a manufacturing method thereof and a secondary battery including the same, and, hereinafter, a composition of the secondary battery and a manufacturing method of the secondary battery will be described.

Composition of Secondary Battery

The present invention relates an ultrabattery in which a positive electrode includes lead dioxide ($PbO_2$), a negative electrode includes lead (Pb) and sulfuric acid ($H_2SO_4$) is used as an electrolyte, and particularly, provides a negative electrode including an electrode plate including lead and an active material layer including composite particles having a core-shell structure.

Hereinafter, characteristics of the respective elements will be described.

The active material layer formed on the negative electrode according to an exemplary embodiment of the present invention includes the composite particles having the core-shell structure. The composite particles are characterized in that a core of the composite particle includes lead (Pb) and a shell of the composite particle includes carbon (C).

The composite particles are manufactured through heat treatment, lead included in the core has an agglomerated structure, particularly, a crystalline structure, through heat treatment, and carbon included in the shell maintains a porous amorphous structure.

An average pore size of carbon particles having porosity is 1 to 100 nm. The average pore size of the carbon particles is particularly 1 to 10 nm, more particularly, 1.75 to 1.82 nm.

A specific surface area of the composite particles is 1 to 5,000 $m^2/g$, particularly, 900 to 1,500 $m^2/g$. This is caused by agglomeration of lead particles included in the composite particles through heat treatment.

A pore volume of the composite particles is 0.1 to 20 $cm^3/g$. The pore volume of the composite particles is particularly 0.2 to 10 $cm^3/g$, more particularly, 0.2 to 0.9 $cm^3/g$.

The composite particles having the core-shell structure have a shape in which the carbon particles surround the lead particles of the core. In more detail, the core-shell structure increases an electrochemical reaction area with the electrolyte and thus suppresses sulfation on an electrode interface. Furthermore, such a core-shell structure reduces interfacial resistance between the active material layer and the electrode plate and may thus remarkably lower resistance of the electrode.

The active material layer of the present invention includes the composite particles having the core-shell structure, and a ratio of the core having the crystalline structure in the composite particles is 0.1 to 50%. The ratio of the core having the crystalline structure in the composite particle is particularly 1 to 50%, more particularly, 10 to 50%. Furthermore, a weight ratio of lead to carbon included in the active material layer is 1:0.001 to 1:9. If the weight ratio of lead to carbon deviates from such a weight ratio range, the core-shell structure may not be properly formed and consequently effects of the present invention may not be achieved.

The electrode plate (hereinafter referred to as a negative electrode plate) forming the negative electrode of the present invention includes lead, and the negative electrode plate is coated with the active material layer.

A thickness of the active material layer coating the negative electrode plate is 1 to 100 μM. When the thickness of the active material layer is less than 1 μm, it may be difficult to control the thickness of the active material layer during manufacture of the negative electrode and sufficient sulfation suppressing effects due to the carbon-lead composite particles may not be expected and, when the thickness of the active material layer exceeds 100 μm, infiltration of the electrolyte may not be smooth and it may be difficult to suppress generation of lead sulfate ($PbSO_4$).

An electrode plate (hereinafter referred to as a positive electrode plate) forming the positive electrode of the present invention includes lead dioxide ($PbO_2$).

The electrolyte of the present invention includes sulfuric acid ($H_2SO_4$), and a specific gravity of sulfuric acid may be 1 to 3.

In the ultrabattery of the present invention, a separator surrounds the negative electrode, and the separator is configured to prevent contact between the positive electrode plate and the negative electrode. The separator may have a thickness of 0.01 to 5 mm, and any kind of material, which may be applied to electrodes including lead and lead dioxide and an electrolyte formed of sulfuric acid, may be used as the separator, without being limited thereto. In an exemplary embodiment of the present invention, absorbent glass fiber is used.

A unit cell forming the ultrabattery of in various aspects of the present invention, the separator surrounds the negative electrode including the active material, the positive electrode plates are stacked on both surfaces of the negative electrode and then the separator again surrounds the negative electrode.

Manufacturing Method of Secondary Battery

A manufacturing method of a negative electrode according to an exemplary embodiment of the present invention includes preparing a mixture by physically mixing lead and carbon, preparing an active material including composite particles having a core-shell structure by performing heat treatment of the mixture, preparing an electrode slurry by mixing the active material with a binder and a solvent, and manufacturing the negative electrode by forming a coating layer by coating an electrode plate including lead with the electrode slurry.

The respective operations of the manufacturing method will be described below. A detailed description of elements, which are substantially the same as those in the above-described configuration of the secondary battery, will be omitted.

Preparation of Mixture

The mixture is prepared by physically mixing lead and carbon. The carbon may be obtained by activating one selected from the group consisting of anthracite, flaming coal, bituminous coal, lignite and combinations thereof.

Such mixing is conducted by physically stirring 10 to 99 parts by weight of lead and 0.1 to 90 parts by weight of carbon at a temperature of 20° C. to 30° C. for 10 minutes to 24 hours. Here, when the weight of lead deviates from such a range, it is difficult to uniformly mix lead and carbon and thus workability may be lowered.

Preparation of Active Material

The active material including the composite particles having the core-shell structure is prepared by performing heat treatment of the mixture.

FIG. 1 is a view briefly illustrating a process of preparing a mixture c by mixing carbon a and lead b, and preparing composite particles d having a core-shell structure by performing heat treatment of the mixture c. A core of the composite particle d having the core-shell structure manufactured through heat treatment includes lead b, and a shell of the composite particle d includes carbon a. Here, lead has a crystalline structure, and carbon has a porous amorphous structure.

Heat treatment is conducted in an electric furnace at a temperature of 100° C. to 380° C. for 1 to 24 hours. When heat treatment is conducted at a temperature of lower than 100° C., lead and carbon are not properly activated and thus desired composite particles may not be formed and, when heat treatment is conducted at a temperature exceeding 380° C., a time taken to cool the composite particles is lengthened due to superfusion of lead and thus process efficiency may be lowered.

The composite particles prepared through heat treatment may pass through a separate cooling process, and the cooling process is performed by leaving the composite particles at room temperature for 1 to 24 hours after stoppage of operation of the electric furnace.

Preparation of Electrode Slurry

The electrode slurry is prepared by mixing the active material with the binder and the solvent. The electrode slurry is prepared by mixing the heat-treated and cooled active material with the binder and then putting an obtained mixture into the solvent.

A content of the active material is 2 to 94% by weight, a content of the binder is 1 to 48% by weight, and a content of the solvent is 5 to 95% by weight relative to the electrode slurry.

The binder may be one selected from the group consisting of Nafion, polyester (PET), polyphenyl oxide (PPO), polytetrafluoroethylene (PTFE), poly ether ether ketone (PEEK), polyvinylidene fluoride (PVDF), polyphenylene sulfide (PPS), carboxymethyl cellulose sodium (CMS), styrene butadiene rubber (SBR), polyethylene glycol (PEG) and combinations thereof.

The solvent may be one selected from the group consisting of water, ethanol, isopropyl alcohol, methanol, sulfuric acid and combinations thereof. Here, sulfuric acid should be essentially added to the solvent of the present invention.

Manufacture of Negative Electrode

The negative electrode is manufactured by forming the active material layer by coating the electrode plate including lead with the electrode slurry. In more detail, the negative electrode plate is coated with the prepared electrode slurry, and the solvent is removed through a drying process. Here, the active material layer formed by completely removing the solvent has a thickness of 1 to 100 μm.

Hereinafter, the present invention will be described in more detail through the following examples. The following examples serve merely to exemplarily describe the present invention and are not intended to limit the scope of the present invention.

Example 1

3 g of lead and 7 g of carbon were quantified and put into a bottle, and were stirred using a ball milling device for 1 hour, thus producing a lead and carbon mixture. The mixture was poured into a crucible and heat treatment was performed in an electric furnace at a temperature of 150° C. for 6 hours, thus producing composite particles. Thereafter, an active material having a core-shell structure was acquired by cooling the composite particles at room temperature for 12 hours after heat treatment.

Examples 2 to 6 and Comparative Example 1

In examples 2 to 6 and comparative example 1, active materials were acquired by varying heat treatment temperature and a content of mixed lead, as stated in Table 1 below.

TABLE 1

|  | Example 1 | Example 2 | Example 3 | Example 4 | Example 5 | Example 6 | Comparative example 1 |
|---|---|---|---|---|---|---|---|
| Pb content | 30% | 30% | 30% | 50% | 50% | 50% | 0% |
| Heat treatment Temp. | 150° C. | 200° C. | 250° C. | 150° C. | 200° C. | 250° C. | — |

In comparative example 1, the active material included carbon particles alone, and heat treatment was not performed.

Test Example 1 (TEM Analysis)

A test to check structures of the active materials of examples 1 to 6 of the present invention was performed.

Figure 2:
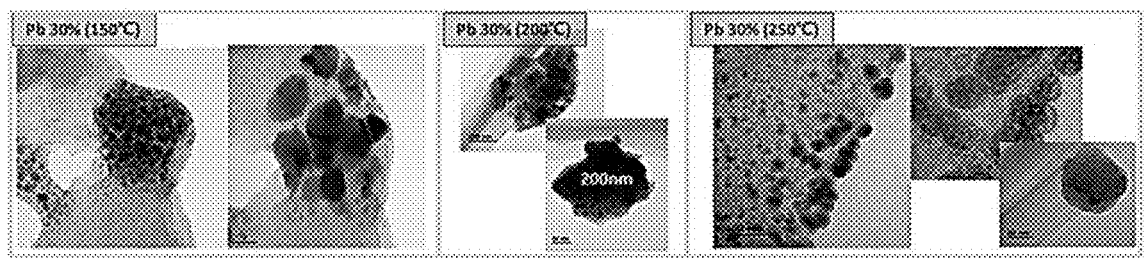
FIG. 2 is a view exemplarily illustrating transmission electron microscope (TEM) photographs of active materials manufactured according to examples 1 to 3.

FIG. 2 shows transmission electron microscope (TEM) photographs of the active materials manufactured according to examples 1 to 3. Through FIG. 2, it may be confirmed that, when the lead content is 30%, carbon particles were adsorbed onto the surfaces of lead particles, and the lead particles formed a core and the carbon particles formed a shell.

Figure 3:
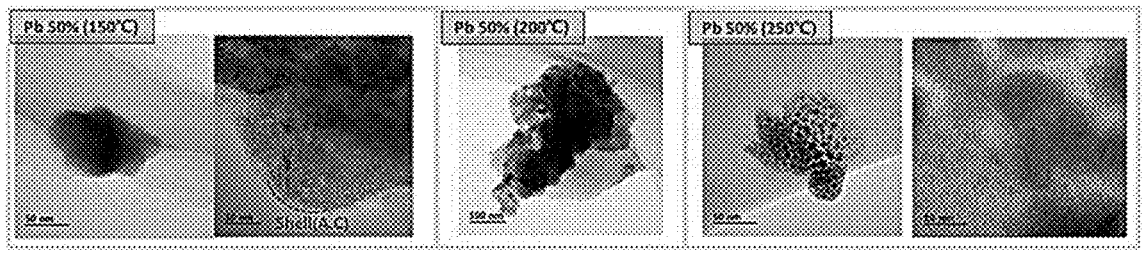
FIG. 3 is a view exemplarily illustrating TEM photographs of active materials manufactured according to examples 4 to 6.

FIG. 3 shows TEM photographs of the active materials manufactured according to examples 4 to 6. It may be confirmed that, when the lead content is 50%, carbon particles were also adsorbed onto the surfaces of lead particles, and the lead particles formed a core and the carbon particles formed a shell. Furthermore, through FIG. 2 and FIG. 3, it may be confirmed that, as the heat treatment temperature is raised from 150° C. to 250° C., the carbon particles were more effectively adsorbed onto the surfaces of the lead particles.

Test Example 2 (XRD Analysis)

A test to check crystallinities of the active materials of examples 1 to 6 of the present invention was performed.

Figure 4:
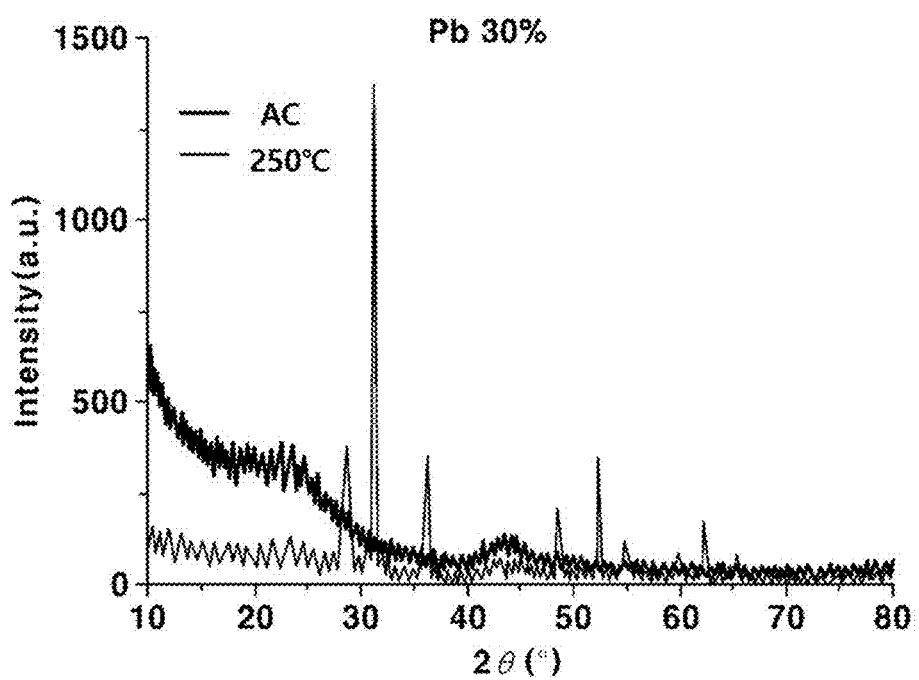
FIG. 4 is a graph representing results of X-ray diffractometry (XRD) analysis of the active materials manufactured according to examples 1 to 3.
Figure 5:
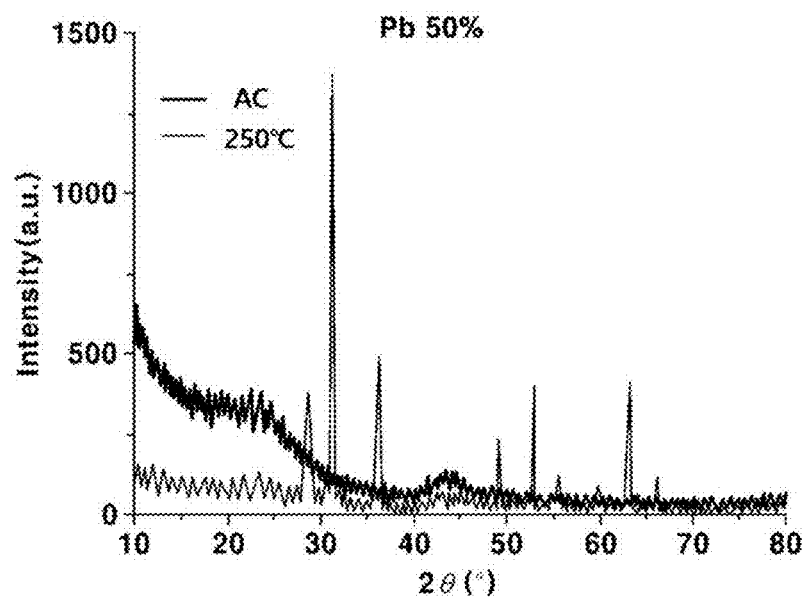
FIG. 5 is a graph representing results of XRD analysis of the active materials manufactured according to examples 4 to 6.

FIG. 4 and FIG. 5 are graphs representing results of X-ray diffractometry (XRD) analysis of the active materials manufactured according to examples 1 to 6. By comparison between FIG. 4 and FIG. 5, it may be confirmed that, as the lead content is increased and the heat treatment temperature is raised, an intensity of an amorphous region of carbon, i.e., a region of 14° to 24° of carbon, was decreased and a crystalline peak of lead was more sharpened. Accordingly, it may be confirmed that crystallinity of lead was increased and the amorphous region of carbon was decreased.

Test Example 3 (BET Analysis)

To check specific surface areas and pore sizes of the active materials manufactured in examples 1 to 6 and comparative example 1, Brunauer-Emmett-Teller (BET) analysis was performed, and Table 2 below represents results thereof.

TABLE 2

| BET | Comparative example 1 | 150° C. | | 200° C. | | 250° C. | |
|---|---|---|---|---|---|---|---|
| | | Example 1 | Example 4 | Example 2 | Example 5 | Example 3 | Example 6 |
| Specific surface area (m²/g) | 1832 | 1212 | 838 | 1240 | 854 | 1225 | 848 |
| Average pore size (nm) | 1.84 | 1.78 | 1.79 | 1.79 | 1.81 | 1.80 | 1.80 |
| Total pore volume (cm³/g) | Pb 0% (0.8) > Pb 30% (0.5) > Pb 50% (0.3) | | | | | | |

Referring to the results of Table 2 above, it may be confirmed that, as the lead content is increased, the specific surface area was decreased due to formation of agglomerated clusters. Furthermore, it may be confirmed that, as the heat treatment temperature is raised, adsorption reaction between lead and carbon was increased and thus formation of the agglomerated clusters was severe, but there was not much change in the pore size.

Test Example 4 (Evaluation of Discharge Performance of Secondary Battery)

Figure 6:
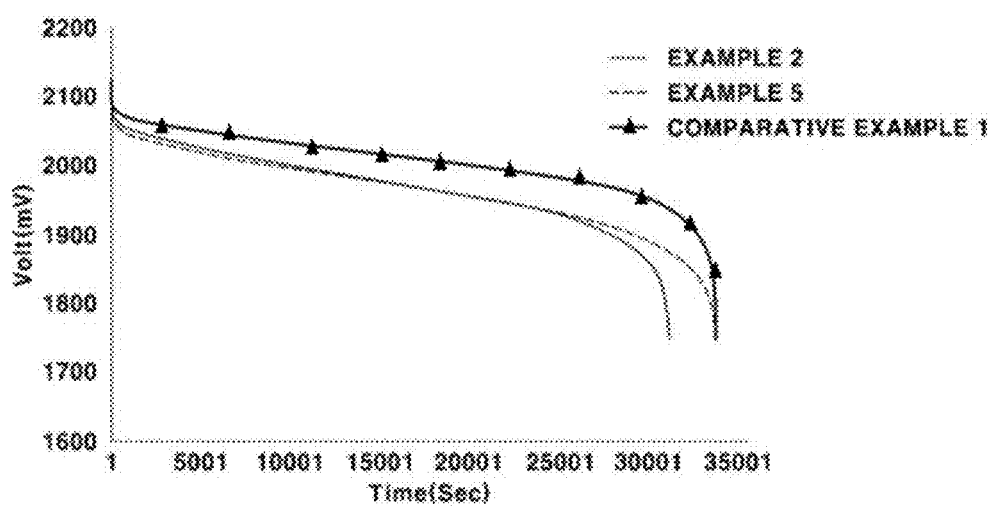
FIG. 6 is a graph representing analysis results of discharge performances of batteries including the active materials of examples 2 and 5.

To analyze discharge performances of secondary batteries including the active materials of examples 2 and 5, secondary batteries were manufactured using the active materials of examples 2 and 5 and comparative example 1, discharge performances of the manufactured secondary batteries were analyzed, and FIG. 6 shows results thereof.

To perform a test, the secondary batteries were charged at a constant current of 0.1 A until a cell voltage reached 2.3 V, were charged at a constant current 0.05 A for 4 hours, and were discharged at a constant current of 0.1 A until the cell voltage reached 1.75 V.

Referring to FIG. 6, the secondary batteries of examples 2 and 5 exhibit discharge performances corresponding to that of the secondary battery of comparative example 1.

In more detail, it may be understood that, since the active materials of examples 2 and 5 served to suppress sulfation and reduce electrode interfacial resistance and thus resistances of the secondary batteries were remarkably reduced, voltages during discharging were maintained at a level corresponding to that of the secondary battery of comparative example 1. Furthermore, it may be confirmed that the active material having the core-shell structure according to an exemplary embodiment of the present invention had an initial discharge capacity corresponding to that of the conventional secondary battery using carbon alone as the active material layer due to the adsorptive structure between lead and carbon and, as the lead content is increased, the discharge capacity was increased.

As described above, the secondary battery including the active material according to an exemplary embodiment of the present invention may exhibit stable discharge voltage characteristics due to battery resistance corresponding to that of the conventional lead-acid battery, and exhibit an enhanced discharge capacity, as compared to the conventional ultrabattery, thus being configured for securing stable performance.

As is apparent from the above description, various aspects of the present invention are directed to providing a negative electrode including an active material having a core-shell structure in which lead and carbon are absorbed onto each other, reduces interfacial resistance between the active material layer in the lead electrode and the lead electrode and may thus secure stable performance of a secondary battery having lower resistance than the conventional ultrabattery.

Furthermore, the secondary battery including the negative electrode according to an exemplary embodiment of the present invention may achieve a higher discharge capacity than the conventional ultrabattery coated with carbon alone.

Furthermore, the negative electrode according to an exemplary embodiment of the present invention may facilitate physical mixing of lead and carbon without a separate additive and heat treatment of a low temperature and thus reduce manufacturing cost of the active material.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A negative electrode of a secondary battery, the negative electrode comprising:
   an electrode plate including lead; and
   an active material layer provided on the electrode plate and including composite particles having a core-shell structure,
   wherein a core of the composite particles includes lead;
   wherein a shell of the composite particles includes carbon; and
   wherein a specific surface area of the composite particles is 900 to 1,500 m²/g.

2. The negative electrode of claim 1, wherein the lead forms a crystalline structure oxidized by heat treatment.

3. The negative electrode of claim 1, wherein the carbon forms a porous amorphous structure oxidized by heat treatment.

4. The negative electrode of claim 1, wherein an average pore size of particles of the carbon is 1 to 100 nm.

5. The negative electrode of claim 1, wherein a pore volume of the composite particles is 0.1 to 20 cm³/g.

6. The negative electrode of claim 2, wherein the composite particles composition comprises the core in an amount of 0.1 wt % to 50 wt %.

7. The negative electrode of claim 1, wherein a weight ratio of the lead to the carbon in the active material layer is 1:0.001 to 1:9.

8. A secondary battery comprising:
a positive electrode;
the negative electrode of claim 1; and
an electrolyte interposed between the positive electrode and the negative electrode.

9. A method of manufacturing a negative electrode of a secondary battery, the method comprising:
preparing a mixture by physically mixing lead and carbon;
preparing an active material including composite particles having a core-shell structure by performing heat treatment of the mixture;
preparing an electrode slurry by mixing the active material with a binder and a solvent; and
manufacturing the negative electrode by forming a coating layer by coating an electrode plate including lead with the electrode slurry,
wherein in the preparing the mixture, the lead includes lead particles having a diameter of 0.1 to 50 μm; and
wherein in the preparing the active material, a core of the composite particles includes the lead, and a shell of the composite particles includes the carbon; and
wherein a specific surface area of the composite particles is 900 to 1,500 m$^2$/g.

10. The method of claim 9, wherein, in the preparing the mixture, the carbon includes carbon particles having a diameter of 0.01 to 50 μm.

11. The method of claim 9, wherein, in the preparing the mixture, a content of the lead is 10 to 99 parts by weight and a content of the carbon is 0.1 to 90 parts by weight.

12. The method of claim 9, wherein, in the preparing the mixture, the mixture is prepared by physically stirring the lead and the carbon at a temperature of 20° C. to 30° C. for 10 minutes to 24 hours.

13. The method of claim 9, wherein, in the preparing the active material, the composite particles are prepared by performing heat treatment of the mixture at a temperature of 100° C. to 380° C. for 1 to 24 hours.

14. The method of claim 9, wherein, in the preparing the electrode slurry, a content of the active material is 2 to 94% by weight, a content of the binder is 1 to 48% by weight, and a content of the solvent is 5 to 95% by weight.

15. The method of claim 9, wherein, in the preparing the electrode slurry, the binder is one selected from the group consisting of Nafion, polyester (PET), polyphenyl oxide (PPO), polytetrafluoroethylene (PTFE), poly ether ether ketone (PEEK), polyvinylidene fluoride (PVDF), polyphenylene sulfide (PPS), carboxymethyl cellulose sodium (CMS), styrene butadiene rubber (SBR), polyethylene glycol (PEG) and combinations thereof.

16. The method of claim 9, wherein, in the manufacturing the negative electrode, a thickness of the coated active material layer is 1 to 100 μm.

* * * * *